July 29, 1941.  F. ABELL  2,250,442
SPEED RECORDING METHOD AND DEVICE
Filed Aug. 16, 1937
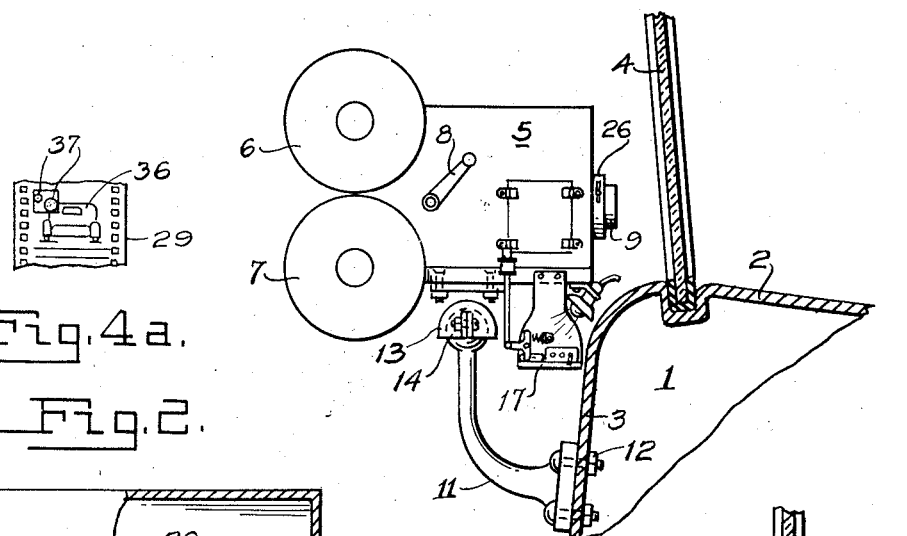
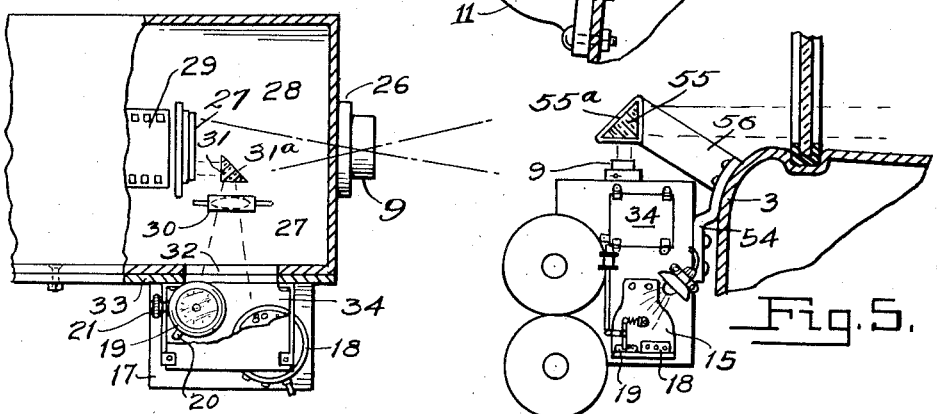
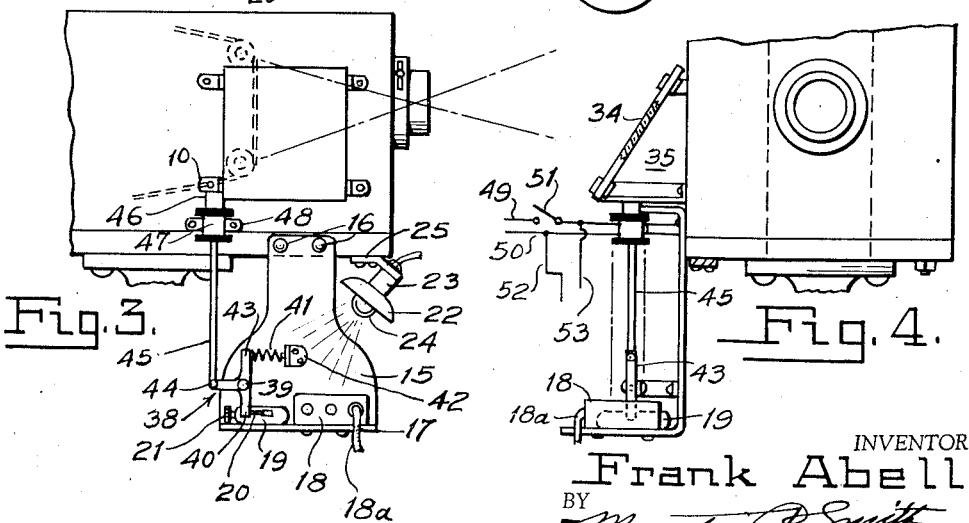
INVENTOR.
Frank Abell
BY
ATTORNEY.

Patented July 29, 1941

2,250,442

UNITED STATES PATENT OFFICE 2,250,442

SPEED RECORDING METHOD AND DEVICE

Frank Abell, Inglewood, Calif.

Application August 16, 1937, Serial No. 159,367

4 Claims. (Cl. 33—46)

My invention involves a method and device for determining the speed of an automobile, or other vehicle, and making a record thereof to be used as evidence in a court of law, or for any other purpose.

This invention is of particular use in recording events concerning the operation of automobiles upon a highway and may be used in court as evidence to prove the recklessness of a specific driver, the exact positions, conditions in the road where he operated the car, and also the speed of the car under such road conditions. The time of the day may also be recorded so as to further aid the court in its determination of the case. Such an invention materially aids the prosecution of traffic cases in that impeachable testimony is avoided. A judge or a jury would need little or no corroborating evidence in the matter after viewing pictures which show exactly what took place.

An object of my invention is to provide a novel method of determining the speed of travel of an object.

Another object is to provide a novel method of determining the speed of travel of an object which comprises taking sequential exposures of the object from a second object, simultaneously recording on each exposure the speed of travel, if any, of the second object, and utilizing the known intervals between exposures, the recorded speed of the second object and the recorded sizes of the first object in the exposures to compute the speed of the first object.

A further object is to provide in a method such as that last described, the step of recording on each exposure an image of a time recording device which indicates the interval between exposures.

An object of the invention is to photographically record the movement of a vehicle, and also speed indicating apparatus.

Another object of the invention is to mount a photographic apparatus upon a vehicle, which is capable of photographing in successive exposures, another vehicle and also speed indicating means upon one and the same film, parts of the film being reserved for particular scenes and said apparatus being positioned so as to conceal it from view to persons outside the vehicle and at the same time arranged so as to not obstruct the view of the occupants of the vehicle.

Another object is the provision of a moving picture camera in a vehicle having a plurality of lenses, one or more of the lenses being utilized to focus a main object upon a sensitized film and one or more of the other lenses being used for focusing another object or objects upon a fractional and exclusive part of said film.

Another object is the provision of a moving picture-like camera having means for focusing foreign or unrelated objects simultaneously upon its film in a manner so that when the film is projected upon a screen a fractional part thereof will clearly show the object or objects of one view, and another fractional part thereof will show the object or objects of another view when screened in the usual and well known manner.

A still further object of the invention is the provision of means for photographically recording two or more objects which are not ordinarily in the same range of view, but are clearly focused upon the same film so that when the film is developed a major scene is shown having a minor scene superimposed thereon in a manner not to interfere with one another.

Still further objects will appear from reading and perusing the specification and drawing.

The following description is made to instruct one skilled in the art how to make, use and vend one or more forms of the invention, but it is to be understood that the description and illustrations are not to be interpreted as limiting the scope of the invention in any manner whatsoever except as limited by the appended claims.

In the drawing:

Figure 1 shows the invention mounted behind a windshield of an automobile, parts being shown in section.

Figure 2 shows a plan view of the invented device, partly in section.

Figure 3 shows an enlarged side elevation of the device.

Figure 4 shows a front elevation of the device, partly in section.

Figure 4a shows a section of a moving picture film.

Figure 5 shows a modified form of the invention mounted vertically upon the dash board of an automobile, parts being shown in section.

Numeral 1 indicates a part of an automobile structure having the usual cowl 2, dashboard 3 and a windshield 4 of glass or other transparent material.

The reference character 5 indicates a moving picture camera which may be of any well known construction having reel cases 6 and 7 so mounted that one of the reels carries the unexposed film, and the other reel carries the exposed film. A hand crank 8 is shown mounted upon the side of the camera for winding a spring therewith in a well known manner which provides stored energy to operate the mechanism necessary to bring portions of the film in rapid successive focus with respect to a main lens 9. The stored energy of the spring is under the control of a finger shift 10. Should the camera be operated by an electric motor or any other means, the element 10 obviously would have the lever to control the starting and stopping of the camera. A bracket arm 11 fixed to the dashboard by means of bolts 12 supports the camera through an adjustable ball pivot 13 in a well known manner; a wing nut 14 being provided to hold the adjustment.

A bracket 15 is fixed to the side of the camera base by screws 16 and has a horizontal shelf 17 upon which is mounted a common type speedometer 18, and stop watch 19. The speedometer and watch may be held to the shelf in any suitable manner such as by welding or, bolts and clamps may be used if preferable. An ordinary pocket watch may also be fixed to the shelf.

In order to have a complete picture-taking operation, the name or designated number of the operator may be suitably applied to the shelf 17.

The speedometer has the usual torque wire and casing 18a which leads to the other moving part of the vehicle having unvaryihgly relative motion in respect to the wheels in the well known manner. The stop watch 19 has a lever 20 which is shiftable to stop and start the watch in a well known manner. The stop watch is provided with the usual winding stem 21.

Mounted beneath the camera is a reflector 22 having a socket 23 and electric lamp 24 so arranged in position so as to illuminate the speedometer and stop watch. A bracket 25 supports the reflector and is fastened to the under side of the camera base by bolts or screws.

The camera also has the usual adjustable diaphragm 26; and a conventional shutter 27 which are connected together in any suitable manner so that they work in unison. The apertures of the diaphragm and shutter are timed in relation to the speed of the film 29, so as to cause successive exposures thereon in a well known manner.

An auxiliary lens 30 is mounted in any suitable manner in alignment with a right angled prism 31 which is so positioned that it will reflect the light through the lens onto a portion of the film 29. An aperture 32 is provided in one vertical wall 33 of the camera which is of sufficient length and breadth to receive reflected light from an inclined mirror 34 having side shields 35. The mirror is set at an angle of 45 degrees with respect to the vertical wall 33 of the camera; and the hypotenuse plane 31a of the prism is set at an angle of 45 degrees with respect to the auxiliary lens axis and also with respect to the plane of the film 29. By this alignment of the lenses and reflection surfaces, the image (speedometer and watch) is focused upon the film simultaneously with the main focus through the lens 9. The speedometer and stop watch, mirror, auxiliary lens and prism are so positioned relative to one another so that the speedometer and stop watch are clearly focused upon a small portion only of the film 29, whereas the larger portion of the film 29 is exposed to the light through the main lens 9. The film 29 is positioned, of course, with respect to the lens 9 and lens 30 so as to bring the reflected light of the main object through 9 into focus therewith in a manner indicated in Figure 4a by the numeral 36; and through lens 30, the smaller object, speedometer and stop watch as indicated by 37.

Means are provided for starting the watch 19 and for stopping it; the means including a double armed bell crank 38 pivoted at 39, one arm 40 thereof being fixed to and positioned to shift the lever 20. Another arm 43 of the bell crank being under the influence of a tension spring 41 which is fixed to a bracket 42, the spring always urging the arm 43 toward the bracket 42. Another arm 44 of the bell crank is pivoted to a rod 45 having a soft iron plunger 46 at one end thereof which is fixed to the camera finger shift 10 by any suitable means.

An electric solenoid 47 held in alignment with the plunger and fixed to the camera base by brackets 48 is so arranged that when the solenoid is energized the energy thereof will pull the plunger 46 downward which will pull the finger shift 10 downward, and start the camera operating, and at the same time, through the operation of the bell crank, actuates the lever 20 to start the stop watch operating. The solenoid is provided with electrical current of any suitable character by insulated wires 49 and 50. A switch 51 is provided in the wire 49 to control the current to the solenoid. This switch may be placed at any convenient location such as on the steering wheel of the vehicle, or upon the dashboard. On the solenoid side of the switch 51 are provided insulated wires 52 and 53 which connect to the socket 23 of the illuminating means. Therefore, by closing the switch 51, the camera is operated, the stop watch is set into operation, and the lamp 24 is illuminated, all simultaneously for the purposes intended.

Obviously, a Bowman wire may be used with practically the same results as are attained through the use of the solenoid.

Figure 5 shows a modification of the invention having the camera, brackets, mirrors, illuminating means, etc. as already explained heretofore for the first described form of the invention. The camera in this instance, however, is fixed vertically to the dash 3 by bracket 54 in a manner so that it can not be readily seen from without the car. The mirror 34 thereof is turned as indicated in order to reflect light into the camera from the speedometer and stop watch located upon the bracket 15, the bracket 15 in this instance being fixed to the camera base so as to support the speedometer and stop watch in proper position of the camera necessitated an additional reflector, preferably a right angled prism 55 having its hypotenuse plane 55a at an angle of 45 degrees to the axis of the main lens 9, and also to the object sighted forward of the automobile. A bracket 56 fixed to the dashboard and the prism may be provided to hold the prism in proper position.

In referring to a stop watch or chronometer as used herein, it is intended that any watch that records time in seconds and fractions thereof may be used.

The invention herein set forth may be used to advantage by police when installed in their automobile or upon their motorcycles for collecting positive evidence in speed cases and due to the provision of the main lens 9, auxiliary lens 30, its prism 31 and the shutter 27 which is common to both lenses the pictures taken simultaneously by the lenses will appear on each frame of the film used in taking the pictures. The film need only be projected upon a screen in court to convince both judge and accused whether or not a certain vehicle exceeded the lawful speed limit. The scene upon the screen would show two independent pictures in the same view; one picture would be the vehicle ahead of the police car, and the other, a speedometer and stop watch. Obviously, if the speedometer picture shows a reading of 30 miles per hour and the main object picture shows the vehicle ahead of the police car obviously diminishing in size, it is clear that the vehicle must have been running at a higher speed than 30 miles per hour. By referring to the stop watch or chronometer, the time interval between any two distances of the diminishing, or for that matter, the increasing size of the vehicle, may be readily determined. For a more accurate check of the vehicle speed, a like vehicle may be photographed at known distances for comparison.

Then by comparing sizes of the vehicles appearing in the pictures, the distance traveled in unit time may be easily computed. This speed, computed with the speed recorded by the speedometer, gives the total speed of the vehicle.

Thus it will be seen that I have provided a speed-recording device that is relatively simple in construction, inexpensive of manufacture and very effective in performing the functions for which it is intended.

It will be understood that minor changes in the size, form and construction of the various parts of my improved speed recording method and device may be made and substituted for those herein shown and described without departing from the spirit of my invention, the scope of which is set forth in the appended claims.

I claim:

1. The method of determining the speed of travel of an object which consists in making a plurality of sequential photographic exposures of said object with a camera traveling in the same direction as said object and at substantially the same linear speed as said object, photographically recording on an unobstructed section of each of said exposures the image of a speedometer to indicate the linear speed of said camera, and utilizing the recorded linear speed of the camera and the recorded size of the photographed object for determining the speed of said object.

2. In a method of recording and determining the speed of a traveling object from a second traveling object traveling in the same direction as said first object and at substantially the same linear speed, the steps of producing on a photographic film strip carried by the second object a plurality of exposures of the first object, simultaneously producing on an unobstructed section of each of said exposures of the first object the images of a speed recording device which indicates the linear speed of the second object and of a timing device which indicates the intervals between exposures, and utilizing the time differential recorded between two or more exposures of the first traveling object, the speed of the second object, and the recorded size of at least a portion of the photographed object for determining the speed thereof.

3. The method of determining the speed of travel of a vehicle, comprising making a plurality of sequential photographic exposures at known intervals of said vehicle from a second vehicle, simultaneously photographically recording on each of said exposures the image of a speed recording device indicating the linear speed of the second vehicle, and utilizing the known intervals between exposures, the recorded linear speed of the second vehicle and the recorded sizes of the first vehicle in the successive exposures for determining the speed of the first vehicle.

4. The method of determining the speed of travel of a vehicle, comprising making a plurality of sequential photographic exposures of said vehicle from a second vehicle, simultaneously photographically recording on each of said exposures the image of a speed recording device indicating the linear speed of the second vehicle and a time recording device indicating the intervals between exposures, and utilizing the recorded intervals between exposures, the recorded linear speed of the second vehicle and the recorded sizes of the first vehicle in the successive exposures for determining the speed of the first vehicle.

FRANK ABELL.